(12) United States Patent
Liao et al.

(10) Patent No.: US 9,752,064 B2
(45) Date of Patent: Sep. 5, 2017

(54) TRANSPARENT UV-CURABLE ADHESIVE

(71) Applicant: NAN YA PLASTICS CORPORATION, Taipei (TW)

(72) Inventors: Te-Chao Liao, Taipei (TW); Chun-Che Tsao, Taipei (TW); Chih-Feng Wang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 15/368,912

(22) Filed: Dec. 5, 2016

(65) Prior Publication Data

US 2017/0166787 A1    Jun. 15, 2017

(30) Foreign Application Priority Data

Dec. 10, 2015   (TW) .............................. 104141466 A

(51) Int. Cl.
| | | |
|---|---|---|
| *C08F 2/46* | (2006.01) | |
| *C08F 2/50* | (2006.01) | |
| *C08G 61/04* | (2006.01) | |
| *C09J 151/08* | (2006.01) | |
| *C08K 5/5425* | (2006.01) | |

(52) U.S. Cl.
CPC ........... *C09J 151/08* (2013.01); *C08K 5/5425* (2013.01)

(58) Field of Classification Search
USPC ............................... 522/96, 90, 1, 113; 520/1
See application file for complete search history.

(56) References Cited

U.S. PATENT DOCUMENTS

| | | | | |
|---|---|---|---|---|
| 6,337,118 | B1 * | 1/2002 | Takehana | B32B 7/12 428/64.1 |
| 6,440,519 | B1 * | 8/2002 | Takase | C08G 18/672 156/275.5 |
| 2014/0065416 | A1 * | 3/2014 | Niwa | B32B 27/308 428/355 AC |
| 2014/0142210 | A1 * | 5/2014 | Zhang | C09J 175/14 522/8 |

FOREIGN PATENT DOCUMENTS

JP    2011-236153    * 11/2011

OTHER PUBLICATIONS

Minami et al, JP 2011-236153 Machine Translation, Nov. 24, 2011.*

* cited by examiner

*Primary Examiner* — Jessica E Whiteley
(74) *Attorney, Agent, or Firm* — Bacon & Thomas, PLLC

(57) ABSTRACT

A transparent ultraviolet curable adhesive is a solventless composition, based on a total weight of the composition, being composed of 35-65 wt % of a polyurethane (meth) acrylate resin, 30-60 wt % of a (meth)acrylate monomer, 0.1-5 wt % of an acrylate group-containing bisphenol fluorene derivative, 0.3-8 wt % of a photopolymerization initiator and 0.002-0.01 wt % of a vinyl silane coupling agent; and, the adhesive if cured has a refractive index of 1.52-1.56 very close to 1.52 for a glass thereof and has a visible light transmittance of 93-99 VLT (%) so suitable to be adhered to displays, transparent conductive film and touch panels.

12 Claims, No Drawings

TRANSPARENT UV-CURABLE ADHESIVE

BACKGROUND OF THE INVENTION

1. Field of the Invention

The present invention relates to a transparent ultraviolet curable (abbreviated as UV-curable) adhesive, and more particularly to a transparent UV-curable adhesive composition is provided with high transparency, high refractive index, excellent adhesion, and excellent workability, and is so suitably applied to be adhered to displays, a transparent conductive film and touch panels.

2. Description of Related Art

Optical transparent adhesive is used in components for touch devices to bind the cover lens and ITO conductive glass or thin film together, and is also used to bind a touch module and an LCD display module together. Such adhesive must have high photopermeability and proper refractive index in order to maintain good visual effects of the resulting products. When used to bind a touch module and an LCD display module together, an adhesive layer has to compensate thickness difference caused by printing, and thus its thickness is usually of 175 μm or more for effective height compensation among various printed patterns and wiring. For the applied adhesive layer to meet the industrial requirements, it has to be thermally stabile, durable, bubbleless, not coming off, and crackless and show no apparent defects.

UV-curable adhesive is free of solvent and thus eliminates the need of a solvent-removing step when forming an adhesive layer. As compared to solvent-containing adhesive, UV-curable adhesive tends to have a thickness more than 175 μm and is unlikely to generate volatile organic compounds (VOCs). For its environmental and other advantages, UV-curable adhesive has been extensively used in manufacturing of optical products.

Light reflects, refracts and diffuses differently in media having different refractive indexes. Such reflection, refraction, and diffusion may have adverse effects on light extraction of products using these media. This problem can be prevented by choosing a materiel of the adhesive layer that has a refractive index similar to that of the substrate so as to enhance transmittance.

Generally, substrate for optical devices is glass. Glass has a refractive index of 1.52. However, currently in optical devices the adhesive layer is usually made of acrylate. Acrylic adhesive may have a refractive index between 1.46 and 1.47, which is different from the refractive index of glass and can degrade light extraction of the resulting optical device. U.S. Pat. No. 7,911,564 discloses a photocurable composition containing polyurethane acrylate (or polyurethane methyl acrylate) and a photocurable prepolymer. However, the composition is poor in photopermeability. For improving transmittance of displays, it is necessary to use optical adhesive that is close to glass in terms of refractive index.

SUMMARY OF THE PRESENT INVENTION

For solving the problem of the prior art about poor thickness compensation, low transmittance, and inadequate thermal stability and durability, it is a primary objective of the present invention to provide a highly-refractive, solventless, transparent UV-curable adhesive that has improved physical properties due to its special resin composition. Particularly, the component of the disclosed composition contains a (meth)acrylic group-containing bisphenol fluorene derivative which has high refractive index (hereinafter shortened as the acrylate group-containing bisphenol fluorene derivative), and which is used to reduce reflection of interface between the adhesive layer made thereof and glass in an optical device. Also the adhesive layer provides excellent thickness compensation and significantly enhanced visible light transmission (VLT %). The resulting adhesive layer adheres to coating with improved adhesion and shows thermal stability and durability.

The highly-refractive UV-curable adhesive of the present invention is solventless and has excellent visible light transmission, thermal stability, durability, adhesion and flexibility. The highly-refractive UV-curable adhesive is a composition prepared from the following components, based on a total weight of the composition, which is composed of:

(A) 35-65 wt % of a polyurethane (meth)acrylate resin;
(B) 30-60 wt % of a (meth)acrylate monomer;
(C) 0.1-5 wt % of an acrylate group-containing bisphenol fluorene derivative;
(D) 0.3-8 wt % of a photopolymerization initiator; and
(E) 0.002-0.01 wt % of a vinyl silane coupling agent.

Therein, the polyurethane (meth)acrylate resin (i.e., component A) is prepared by reacting a polyol, a polyisocyanate and a hydroxyl group-containing (meth)acrylic compound, and has a weight-average molecular weight (Mw) of 10,000-50,000.

The acrylate group-containing bisphenol fluorene derivative (i.e., component C) in the disclosed highly-refractive UV-curable adhesive effectively enhances the adhesive's transmittance and in turn enhances a resulting adhesive layer's refractive index. Moreover, the combination of the acrylate group-containing bisphenol fluorene derivative (C) and (meth)acrylate monomer (i.e., component B) in different amounts further improves the adhesive in terms of visible light transmission (or called transmittance) and flexibility. The combination also acts as a solvent that reduces the overall viscosity of the adhesive.

The vinyl silane coupling agent (i.e., component E) in the disclosed highly-refractive UV-curable adhesive improves the moistening and binding effects between the adhesive and the coating it is applied to, thereby enhancing the adhesive's adhesion. Particularly, after exposed in ultraviolet, the vinyl silane coupling agent (E) facilitates generation of binding between the unsaturated groups of the coupling agent and the molecules of the coating, thereby enhancing the thermal stability as well as durability between the adhesive and the coating.

DETAILED DESCRIPTION OF THE INVENTION

The transparent UV-curable adhesive of the present invention is a composition made of the following components of (A)-(E), based on a total weight of the composition:

(A) 35-65 wt % of a polyurethane (meth)acrylate resin;
(B) 30-60 wt % of a (meth)acrylate monomer;
(C) 0.1-5 wt % of an acrylate group-containing bisphenol fluorene derivative;
(D) 0.3-8 wt % of a photopolymerization initiator; and
(E) 0.002-0.01 wt % of a vinyl silane coupling agent.

The transparent UV-curable adhesive of the present invention has a refractive index of 1.49-1.56, preferably 1.52-1.56, very close to a glass with a refractive index of 1.52, and has a has very good visible light transmittance of 93-99 VLT (%).

The polyurethane (meth)acrylate resin (i.e., component A) is prepared by reacting a polyol, a polyisocyanate and a hydroxyl group-containing (meth)acrylic monomer. More particularly, it is prepared by mixing the polyol, the polyisocyanate, and the hydroxyl group-containing (meth)acrylic monomer evenly without presence of any solvents and then heating the mixture to 60-100° C. in presence of a stannum (Sn) catalyst for reaction for 8-12 hours. Its weight-average molecular weight (Mw) is of 10,000-50,000, and preferably of 25,000-35,000. The viscosity of the transparent UV-curable adhesive is determined by the molecular weight of the polyurethane (meth)acrylate resin (A). The higher the molecular weight of the polyurethane (meth)acrylate resin (A) is, the higher the viscosity of the adhesive is. The higher viscosity is in turn responsible for poor workability and uniformity during application of the adhesive.

The polyurethane (meth)acrylate resin (A) in the disclosed transparent UV-curable adhesive is in an amount of preferably 35-65 wt %, and more preferably 40-60 wt %, based on the total weight of the composition. When the amount of the polyurethane (meth)acrylate resin (A) is below 35 wt %, the disclosed UV-curable adhesive, after exposed to ultraviolet, has poor physical properties, meaning that it is relatively brittle and has inferior adhesion. On the other hand, when the amount is greater than 65 wt %, the liquid adhesive is too viscous to be applied easily.

The polyol must have more than two OH groups (i.e., hydroxy groups) and a number-average molecular weight Mn of 500-4000. The polyol may be any one alone or any combination of polyester polyol, polyether polyol, polycaprolactone polyol, polycarbonate polyol, polybutadiene polyol, polytetramethylene ether glycol, and polypropylene glycol. For ensuring good adhesion of the adhesive, the polyol is preferably polyether polyol, which has a number-average molecular weight of 500-4000, and more preferably 1000-2000.

The above-mentioned polyisocyanate must have more than two "—N=C=O" groups (i.e., Isocyanate groups) which may be any one alone or any combination of aromatic diisocyanates, i.e., the polyisocyanate is one or more selected from the group consisting of toluene diisocyanate, xylene diisocyanate, hexamethylene diisocyanate, norbornylene diisocyanate, isophorone diisocyanate, naphthalene diisocyanate, 1,6-hexamethylene diisocyanate, cyclohexane diisocyanate, hydrogenated xylene diisocyanate, trimethyl hexamethylene diisocyanate and tetramethyl xylylene diisocyanate. For ensuring the adhesive's good adhesion and preventing the adhesive from yellowing under high heat, the polyisocyanate is preferably norbornylene diisocyanate, isophorone diisocyanate, hexamethylene diisocyanate or cyclohexane diisocyanate, and more preferably hydrogenated xylene diisocyanate or a diisocyanate having an alicyclic structure.

The reaction between the hydroxyl group-containing (meth)acryl monomer and the aforesaid polyisocyanate introduces (meth)acryloyl groups into the polyurethane (meth)acrylate resin (A).

The hydroxyl group-containing (meth)vinyl monomer may be one or more selected from the group consisting of 2-hydroxyethyl (meth)acrylate, 2-hydroxypropyl (meth)acrylate, 4-hydroxybutyl (meth)acrylate, pentaerythritol (meth)acrylate, glyceryl (meth)acrylate, pentaerythrityl tri(meth)acrylate and dipentaerythrityl penta(meth)acrylate.

During preparation of the polyurethane (meth)acrylate resin (A), a catalyst (or a catalyzer) may be used for accelerating the reaction.

The catalyst for preparing the polyurethane (meth)acrylate resin (A) may be one or more selected from the group consisting of tin octoate, dibutyl tin dilaurate, triethylamine and triethylenediamine, and is preferably organic tin.

The disclosed transparent UV-curable adhesive is made without using any solvent. However, for reducing the material's in-process viscosity, the (meth)acrylate monomer (i.e., component B) is used to control the overall in-process viscosity and ensure even proceeding of the process. In the process, the sequence of material feeding is critical to the synthesis of the transparent adhesive. The (meth)acrylate monomer (B) acting as a solvent is first placed into the reactor, and then the polyurethane (meth)acrylate resin (A) is gradually input. By doing so, the viscosity can be well controlled. The (meth)acrylate monomer (B) serves also as a reactant that contributes to the adhesive composition's adhesion.

The (meth)acrylate monomer (B) may be selected from acrylic acid or methyl acrylic acid, or derivatives thereof. The (meth)acrylate monomer (B) may be any one alone or any combination of (meth)methacrylate, (meth)ethyl acrylate, (meth)propyl acrylate, (meth)isopropyl acrylate, (meth)butyl acrylate, (meth)isobutyl acrylate, (meth)cyclohexyl acrylate, (meth)octyl acrylate, (meth)isooctyl acrylate, (meth)2-ethylhexyl acrylate, (meth)isodecyl acrylate, (meth)lauryl acrylate, (meth)isobornyl acrylate, (meth)acrylamide, (meth)acryloyl morpholine, dimethyl (meth)acrylamide, diethyl (meth)acrylamide and dimethylaminopropyl acrylamide. The (meth)acrylate monomer (B) is preferably (meth)isobornyl acrylate (isobornyl acrylate) or/and dimethyl (meth) acrylate. The resulting UV-curable adhesive after exposed to ultraviolet and cured shows good adhesion.

In the disclosed transparent UV-curable adhesive, the (meth)acrylate monomer (B) is preferably in an amount of 30-60 wt %, and more preferably 40-55 wt %, based on the total weight of the composition. When the (meth)acrylate monomer (B) is in an amount below 30 wt %, the adhesiveness of the resulting UV-curable adhesive if attached to a substrate or a laminate become inferior and less tightly adherent to the substrate or the laminate. Likewise, when the usage amount is higher than 60 wt %, the resulting UV-curable adhesive has reduced cohesion and in turn inferior adhesion to the substrate or the laminate in which it is applied to.

In particular, when having a proper combination of 2-ethylhexyl acrylate, dimethyl acrylamide and isobornyl acrylate, the (meth)acrylate monomer (B) contributes best to the desired flexibility and visible light transmission for the resulting UV-curable adhesive. For a preferable example, the (meth)acrylate monomer (B) is prepared from a combination of 100 wt % of 2-ethylhexyl acrylate, 50-80 wt % of dimethyl acrylamide and 20-50 wt % of isobornyl acrylate, all based on the weight of 2-ethylhexyl acrylate, the prepared (meth)acrylate monomer (B) endows the resulting UV-curable adhesive with the physical properties most preferred for the purpose of the present invention, including having the best flexibility and visible light transmission. Nevertheless, the maximum usage amount of dimethyl acrylamide is limited to no more than 30 wt % of the total weight of the composition since a higher content thereof may excessively reduce the viscosity of the resulting UV-curable adhesive and bring about adverse effects.

The acrylate group-containing bisphenol fluorene derivative (i.e., component C) must have more than two acrylic groups, e.g., including one alone or any combination of SMS-F9PGA (i.e., 9,9-bis[4-(3-acryloxy-2-hydroxypropyloxy)phenyl]fluorene), SMS-F9PEOA (i.e., 9,9-bis[4-(2-acryloxyethoxy)phenyl]fluorine) and SMS-F9CrAE (i.e., 9,9-bis[4-(allyloxy)-3-methylphenyl]), all commercially available from S.M.S. Technology Co., Ltd., Taiwan.

In the disclosed transparent UV-curable adhesive, the acrylate group-containing bisphenol fluorene derivative (C) is in an amount of 0.1-5.0 wt %, preferably 0.25-2.5 wt %, and more preferably 2.5 wt % based on the total weight of the composition. When the acrylate group-containing bisphenol fluorene derivative (C) has its usage amount lower than 0.1 wt %, the resulting UV-curable adhesive has a low refractive index. Where its usage amount greater than 5 wt %, the resulting adhesive is less cohesive and is less adhesive to the substrate or the laminate in which it is applied to.

In use, the disclosed UV-curable transparent adhesive is to adhere to the indium tin oxide (ITO) material in a touch panel. For preventing ITO in the touch panel from corrosion caused by the ions in the photopolymerization initiator, the photopolymerization initiator (i.e., component D) has to be chosen carefully.

The photopolymerization initiator (D) may be any one alone or any combination of 2,2-dimethoxy-1,2-diphenylethane-1-one, 1-hydroxycyclohexyl phenyl ketone, 2-hydroxyl-2-methyl-1-phenylpropane-1-one, 1-(4-isopropylphenyl)-2-hydroxyl-2-methylpropane-1-one, 1-hydroxylcyclohexylphenylketone, 4-(2-hydroxylethoxy)-phenyl(2-hydroxyl-2-propyl)ketone, 2-methyl-[4-(methylthio)phenyl]-2-morpholino-1-acetone, 1-[4-(2-hydroxylethoxy)-phenyl]-2-hydroxyl-2-methyl-1-propane, bis(2,4,6-trimethyl benzoyl)-phenylphosphine oxide and 2,4,6-trimethyl benzoyldiphenyl phosphine oxide. For improving the resulting transparent UV-curable adhesive excellent in adhesion and curability, the photopolymerization initiator (D) is preferably 2,2-dimethoxy-1,2-diphenylethane-1-one, 1-hydroxycyclohexyl phenyl ketone or/and 2,4,6-trimethyl benzoyldiphenyl phosphine oxide.

In the disclosed transparent UV-curable adhesive, the photopolymerization initiator (D) is in an amount of preferably 0.3-8.0 wt % and more preferably 1-5 wt % based on the total weight of the composition. When the usage amount of the photopolymerization initiator (D) is below 0.3%, the resulting transparent UV-curable adhesive has poor photocurability. When its usage amount is more than 8%, the resulting transparent UV-curable adhesive, after the photocuring process, has inferior adhesion.

For improving other properties of the disclosed transparent UV-curable adhesive, other additives may be added. These may include photostabilizers, colorants, polymerization inhibitors, hardeners, hardening accelerators, leveling agents, tackifiers, antistatic agents, fire retardants, defoamants, silane coupling agents, thermal polymerization inhibitors or antioxidants.

For the disclosed transparent UV-curable adhesive to have lasting transparency that does not disintegrate over time, a vinyl silane coupling agent is vital as a component (i.e., component E). The vinyl silane coupling agent (E) and the acrylate group-containing bisphenol fluorene derivative (C) crosslink with each other and thereby endow the disclosed transparent UV-curable adhesive with lasting transparency, thermal stability and durability. The adhesive thus can remain highly transparent and does not go hazed after long-term exposure to light, and can preserve desired physical properties such as tear strength and tension. This is another feature of the present invention.

In the disclosed transparent UV-curable adhesive, the vinyl silane coupling agent (E) is in an amount of 0.002-0.01 wt %, preferably 0.006-0.01 wt %, and more preferably 0.0075 wt % based on the composition's total weight. Its usage amount shall be controlled or the resulting adhesive will undesirably have its transparency disintegrated under heat and over time. The vinyl silane coupling agent (E) may be vinyl trimethoxy silane or/and vinyl triethoxy silane.

The disclosed UV-curable transparent adhesive hardens when exposed to ultraviolet such as that emitted from a high-pressure mercury-vapor lamp, a metal halide lamp, a xenon flash or a light-emitting diode lamp. It is to be noted that the ultraviolet has a density preferably of 0.05-5 J/cm$^2$, and more preferably of 0.1-3 J/cm$^2$.

In use, a properly selected coating machine is implemented, such as a comma coating machine, a plate coating machine or a blade coating machine. The disclosed transparent UV-curable adhesive is first applied to a sheet of silicone-treated PET film, and another sheet of silicone-treated PET film is placed thereon. The two firmly bonded sheets together with the adhesive therebetween are then exposed to ultraviolet, so the transparent UV-curable adhesive is cured to form a transparent adhesive layer that has outstanding adhesion.

The following examples and comparative examples are described for illustrating the present invention and are not intended to limit the scope of the present invention.

The transparent UV-curable adhesive compositions made in the examples and comparative examples described below were assessed for their physical properties by means of the following approaches.

1. Viscosity

The UV-curable adhesive compositions before cured were measured for viscosity at 25° C. using a viscosity gauge modeled Brookfield LV.

2. Preparation of Test Specimens of UV-Curable Adhesive Compositions

Each of the UV-curable adhesive compositions made in the example and comparative examples were applied to a sheet of silicone-treated 75 μm PET film to a thickness of 175 μm and had another sheet of silicone-treated 75 μm PET film attached thereto before being exposed to ultraviolet having a density of 1.0 J/cm$^2$.

3. Refractive Index

A refractometer modeled ATAGO ABBE T3 was used to measure the refractive indexes of the UV-exposed UV-curable adhesive compositions.

4. Tensile Test

The cured adhesive compositions were cut into pieces each size is width of 25 mm and length of 180 mm, and pressured on glass by a 2 kg roller for 30 minutes. A tensile test machine was used to test the compositions' glass adhesion with a speed of 300 mm/min and a peeling angle of 180° in an environment of 23° C. and 50% RH. The tensile test machine used is made in Taiwan, modeled Cometech QC-508PA.

5. Test of Visible Light Transmission (VLT %):

A haze meter made by Tokyo Denshoku Co., Ltd. (Japan) and modeled TC-H III was used to measure the cured optical transparent (adhesive) films for their light transmission levels and haze values in line with JIS K7705 specifications. The greater transmission of visible light related to the more transparent thin film.

6. Test of Long-Term Visible Light Transmission (VLT %):

The test specimens were prepared as described previously but tested in the foregoing way after kept at 60° C. for six months.

7. Assessment of Thermal Stability and Durability:

Each of the adhesive compositions made in the examples and comparative examples was applied to one surface of a glass plate and rolled to even, and then kept in an autoclave set at 50° C. and 5 bar for 20 minutes so as to form a test specimen.

Every test specimen was made in duplicate, one of them is placed under a condition subject to a temperature of 60° C. and a humidity of 95% RH for 500 hours, the other is placed under a condition subject to a temperature of 85° C. for 500 hours respectively. The specimen were visually observed for any bubbles, coming off and cracks and rated according to the following criteria.

"Very Good" indicates that the test specimen was free of apparent defects such as bubbles, coming off and cracks;

"Good" indicates that the test specimen had a few apparent defects such as bubbles, coming off and cracks;

"Poor" indicates that the test specimen had some apparent defects such as bubbles, coming off and cracks; and "Very Poor" indicates that the test specimen had obvious apparent defects such as bubbles, coming off and cracks.

8. Flexibility

The test specimens of the UV-curable adhesive compositions were prepared as described previously for flexibility measurement. The cured ultraviolet adhesive compositions were cut into piece-like specimens each size is width of 25 mm and length of 180 mm. Each of the specimens was flicked with fingers and rated in terms of flexibility to one of the three flexibility levels:

"Good" indicates that the test specimen was very flexible;

"Fair" indicates that the test specimen was flexible yet a little stiff; and

"Poor" indicates that the test specimen was relatively stiff.

Preparation of Polyurethane Acrylate Resins A1-A5

The polyurethane acrylate resins of the examples and comparative examples were prepared by reacting the polyol, the polyisocyanate and the hydroxyl-group-containing (meth)acrylic monomer in the proportional combinations listed in Table 1.

TABLE 1

| Product | | PTMEG[2] | PPG[3] | 2-hydroxyethyl acrylate | isophorone diisocyanate | Synthesized Resin Molecular Weight |
|---|---|---|---|---|---|---|
| PU Acrylate Resin[1] | (A1) | 200 | — | 4.3 | 45.7 | 29,000 |
|  | (A2) | — | 200 | 4.3 | 45.7 | 28,000 |
|  | (A3) | 100 | 100 | 4.3 | 45.7 | 32,000 |
|  | (A4) | 200 | — | 4.3 | 45.7 | 15,000 |
|  | (A5) | — | 200 | 4.3 | 45.7 | 14,000 |

Note:
[1]PU Acrylate Resin represents polyurethane acrylate resin;
[2]PTMEG represents polytetramethylene ether glycol;
[3]PPG represents polypropylene glycol.

Example 1

In a four-neck flask equipped with a thermometer, an agitator, a nitrogen gas inlet, and a reflux condenser, 200 g of polytetramethylene ether glycol (having a number-average molecular weight of 1,000), and 4.3 g of 2-hydroxyethyl acrylate were added. After the mixture was heated to 60° C., 45.7 g of isophorone diisocyanate was added. Then 0.1 g of bis(lauroyloxy) dioctyl tin was added. The mixture was heated to and held at 70° C. for 10 hours. The value of isocyanate was measured and when the reaction rate reached 99%, the reaction was ended, thereby obtaining polyurethane acrylate resin (A1) having a weight-average molecular weight of 29,000.

Afterward, 125 g of 2-ethylhexyl acrylate (B1), 100 g of dimethyl acrylamide (B2), 25 g of isobornyl acrylate (B3), 1.3 g of the acrylate-group-containing bisphenol fluorene derivative SMS-F9PGA (C1), and 0.01 g of the vinyl silane coupling agent (E1) were added and stirred to homogeneity. Following this, 15 g of 2,4,6-trimethyl benzoyldiphenyl phosphine oxide (D1) was added while stirring to homogeneity, and a transparent UV-curable adhesive was obtained.

The transparent UV-curable adhesive so made was subject to measurement for its physical properties, and the results are shown in Table 2.

Example 2

Polyurethane acrylate resin (A1) was synthesized according to the method of Example 1. Then, 125 g of 2-ethylhexyl acrylate(B1), 100 g of dimethyl acrylamide (B2), 25 g of isobornyl acrylate (B3), 1.3 g of the acrylate-group-containing bisphenol fluorene derivative SMS-F9PGA (C1), and 0.015 g of the vinyl silane coupling agent (E1) were added and stirred to homogeneity. Following this, 15 g of 1-hydroxycyclohexyl phenyl ketone (D2) was added while stirring to homogeneity, and a transparent UV-curable adhesive was obtained.

The transparent UV-curable adhesive so made was subject to measurement for its physical properties, and the results are shown in Table 2.

Example 3

Polyurethane acrylate resin (A1) was synthesized according to the method of Example 1. Then, 125 g of 2-ethylhexyl acrylate(B1), 100 g of dimethyl acrylamide (B2), 25 g of isobornyl acrylate (B3), 6.5 g of the acrylate-group-containing bisphenol fluorene derivative SMS-F9PGA (C1), and 0.05 g of the vinyl silane coupling agent (E1) (equivalent to 0.0067 wt % of the composition's total weight) were added and stirred to homogeneity. Following this, 15 g of 1-hydroxycyclohexyl phenyl ketone (D2) was added and stirred to homogeneity, and a transparent UV-curable adhesive was then obtained.

The transparent UV-curable adhesive so made was subject to measurement for its physical properties, and the results are shown in Table 2.

Example 4

Polyurethane acrylate resin (A1) was synthesized according to the method of Example 1. Then, 125 g of 2-ethylhexyl acrylate (B1), 100 g of dimethyl acrylamide (B2), 25 g of isobornyl acrylate (B3), 13 g of the acrylate-group-containing bisphenol fluorene derivative SMS-F9PGA (C1), and 0.04 g of the vinyl silane coupling agent (E1) (equivalent to 0.0075 wt % of the composition's total weight) were added and stirred to homogeneity. Following this, 15 g of 1-hydroxycyclohexyl phenyl ketone (D2) was added and stirred to homogeneity, and a transparent UV-curable adhesive was then obtained.

The transparent UV-curable adhesive so made was subject to measurement for its physical properties, and the results are shown in Table 2.

Example 5

In a four-neck flask equipped with a thermometer, an agitator, a nitrogen gas inlet, and a reflux condenser, 200 g of polypropylene glycol (having a molecular weight of 1,000) and 4.3 g of 2-hydroxyethyl acrylate were added. After the mixture was heated to 60° C., 45.7 g of isophorone diisocyanate was added. Then 0.1 g of bis(lauroyloxy) dioctyl tin was added. The mixture was heated to and held at 70° C. for 10 hours for reaction. The value of isocyanate was measured and when the reaction rate reached 99%, the reaction was ended, thereby obtaining a polyurethane acrylate resin (A2) having a weight-average molecular weight of 28,000.

Afterward, 125 g of 2-ethylhexyl acrylate (B1), 100 g of dimethyl acrylamide (B2), 25 g of isobornyl acrylate (B3), 18.7 g of the acrylate-group-containing bisphenol fluorene derivative SMS-F9PGA (C1), and 0.05 g of the vinyl silane coupling agent (E1) were added and stirred to homogeneity. Following this, 15 g of 2,4,6-trimethyl benzoyldiphenyl phosphine oxide (D1) was added and stirred to homogeneity, and a transparent UV-curable adhesive was then obtained.

The transparent UV-curable adhesive so made was subject to measurement for its physical properties, and the results are shown in Table 2.

Example 6

In a four-neck flask equipped with a thermometer, an agitator, a nitrogen gas inlet, and a reflux condenser, 100 g of polytetramethylene ether glycol (having a number-average molecular weight of 1,000), 100 g of polypropylene glycol (having a molecular weight of 1,000), and 4.3 g of 2-hydroxyethyl acrylate were added. After the mixture was heated to 60° C., 45.7 g of isophorone diisocyanate was added. Then 0.1 g of bis(lauroyloxy) dioctyl tin was added. The mixture was heated to and held at 70° C. for 10 hours for reaction. The value of isocyanate was measured and when the reaction rate reached 99%, the reaction was ended, thereby obtaining a polyurethane acrylate resin (A3) have a weight-average molecular weight of 32,000.

Afterward, 125 g of 2-ethylhexyl acrylate(B1), 100 g of dimethyl acrylamide (B2), 25 g of isobornyl acrylate (B3), 27.1 g of the acrylate-group-containing bisphenol fluorene derivative SMS-F9PGA (C1), and 0.05 g of the vinyl silane coupling agent (E1) were added and stirred to homogeneity. Following this, 15 g of 2,4,6-trimethyl benzoyldiphenyl phosphine oxide (D1) was added and stirred to homogeneity, and a transparent UV-curable adhesive was then obtained.

The transparent UV-curable adhesive so made was subject to measurement for its physical properties, and the results are shown in Table 2.

Example 7

The polyurethane acrylate resin (A3) was synthesized using the method of Example 6. Then 125 g of 2-ethylhexyl acrylate (B1), 100 g of dimethyl acrylamide (B2), 25 g of isobornyl acrylate (B3), 6.5 g of the acrylate-group-containing bisphenol fluorene derivative SMS-F9PEOA (C2), and 0.05 g of the vinyl silane coupling agent (E1) were added and stirred to homogeneity.

Following this, 15 g of 1-hydroxycyclohexyl phenyl ketone (D2) was added and stirred to homogeneity, and a transparent UV-curable adhesive was then obtained.

The transparent UV-curable adhesive so made was subject to measurement for its physical properties, and the results are shown in Table 2.

Comparative Example 1

In a four-neck flask equipped with a thermometer, an agitator, a nitrogen gas inlet, and a reflux condenser, 200 g of polytetramethylene ether glycol (having a number-average molecular weight of 1,000) and 4.3 g of 2-hydroxyethyl acrylate were added. After the mixture was heated to 60° C., 45.7 g of isophorone diisocyanate was added. Then, 0.1 g of bis(lauroyloxy) dioctyl tin was added. The mixture was afterward heated to and held at 85° C. for 6 hours for reaction. The value of isocyanate was measured and when the reaction rate reached 99%, the reaction was ended, thereby obtaining a polyurethane acrylate resin (A4) having a weight-average molecular weight of 15,000.

Afterward, 125 g of 2-ethylhexyl acrylate (B1), 100 g of dimethyl acrylamide (B2), 25 g of isobornyl acrylate (B3), and 0.015 g of aminosilane coupling agent (E2) were added and stirred to homogeneity. Following this, 15 g of 2,4,6-trimethyl benzoyldiphenyl phosphine oxide (D1) was added and stirred to homogeneity, and a UV-curable adhesive was then obtained.

The transparent UV-curable adhesive so made was subject to measurement for its physical properties, and the results are shown in Table 2.

Comparative Example 2

In a four-neck flask equipped with a thermometer, an agitator, a nitrogen gas inlet, and a reflux condenser, 200 g of polypropylene glycol (having a number-average molecular weight of 1,000) and 4.3 g of 2-hydroxyethyl acrylate were added. The mixture was heated to 60° C. before 45.7 g of isophorone diisocyanate was added thereinto. Then, 0.1 g of bis(lauroyloxy) dioctyl tin was added. The mixture was heated to and held at 85° C. for 6 hours for reaction. The value of isocyanate was measured and when the reaction rate reached 99%, the reaction was ended, thereby obtaining a polyurethane acrylate resin (A5) having a weight-average molecular weight of 14,000.

Afterward, 125 g of 2-ethylhexyl acrylate (B1), 100 g of dimethyl acrylamide (B2), and 25 g of isobornyl acrylate (B3) were added and stirred to homogeneity. Following this, 15 g of 2,4,6-trimethyl benzoyldiphenyl phosphine oxide (D1) was added and stirred to homogeneity, and a UV-curable adhesive was then obtained.

The transparent UV-curable adhesive so made was subject to measurement for its physical properties, and the results are shown in Table 2.

Comparative Example 3

The polyurethane acrylate resin (A1) was made using the method of Example 1, and 225 g of 2-ethylhexyl acrylate (B1), 25 g of isobornyl acrylate (B3), 1.3 g of the acrylate-group-containing bisphenol fluorene derivative SMS- F9PGA (C1), and 0.20 g of the vinyl silane coupling agent (E1) were added and stirred to homogeneity.

Afterward 15 g of 2,4,6-trimethyl benzoyldiphenyl phosphine oxide (D1) was added and stirred to homogeneity, and a UV-curable adhesive was then obtained.

The transparent UV-curable adhesive so made was subject to measurement for its physical properties, and the results are shown in Table 2.

Comparative Example 4

The adhesive was made similar to Comparative Example 3 but had the usage amount of the acrylate-group-containing bisphenol fluorene derivative SMS-F9PGA (C1) changed to 30 g and no any vinyl silane coupling agent (E1) was added.

The transparent UV-curable adhesive so made was subject to measurement for its physical properties, and the results are shown in Table 2.

after cured, each not only has a refractive index of ranging from 1.52 to 1.56 very close to a refractive index of 1.52 for a glass, but also has a visible light transmittance ranging from 93 to 99 VLT (%) as well as has very good light transmission, so suitable to be adhered to displays, transparent conductive film and touch panels.

2. By comparing Example 1 and Comparative Example 3, the UV-curable adhesive of Comparative Example 3 has a viscosity of 5000 mPa·s and the transparent UV-curable adhesive of Example 1 has a viscosity of 2100 mPa·s, it is found that adding dimethyl acrylamide through introduction of the (meth)acrylate monomer effectively reduced the transparent UV-curable adhesive's viscosity and improved its workability. After exposed to ultraviolet, the transparent UV-curable adhesive also showed improved adhesion.

3. From the results, it is found that compared to the compositions without the acrylic bisphenol fluorene derivative of Comparative Examples 1 and 2, the transparent UV-curable adhesive compositions with the acrylate group-containing bisphenol fluorene derivative of Examples 1-7

TABLE 2

Formulas and results of transparent UV-curable adhesive compositions

| Components (unit: g) | Examples | | | | | | | Comparative Examples | | | |
|---|---|---|---|---|---|---|---|---|---|---|---|
| | 1 | 2 | 3 | 4 | 5 | 6 | 7 | 1 | 2 | 3 | 4 |
| A  PU Acrylate Resin (A1) | 250 | 250 | 250 | 250 | — | — | — | — | — | 250 | 250 |
| PU Acrylate Resin (A2) | — | — | — | — | 250 | — | — | — | — | — | — |
| PU Acrylate Resin (A3) | — | — | — | — | — | 250 | 250 | — | — | — | — |
| PU Acrylate Resin (A4) | — | — | — | — | — | — | — | 250 | — | — | — |
| PU Acrylate Resin (A5) | — | — | — | — | — | — | — | — | 250 | — | — |
| B  2-Ethylhexyl Acrylate (B1) | 125 | 125 | 125 | 125 | 125 | 125 | 125 | 125 | 80 | 225 | 225 |
| Dimethyl Acrylamide (B2) | 100 | 75 | 62.5 | 100 | 100 | 100 | 100 | 100 | 150 | — | — |
| Isobornyl Acrylate (B3) | 25 | 50 | 62.5 | 25 | 25 | 25 | 25 | 25 | 20 | 25 | 25 |
| C  SMS-F9PGA (C1)[1] | 1.3 | 1.3 | 6.5 | 13.0 | 18.7 | 27.1 | — | — | — | 1.3 | 30 |
| SMS-F9PEOA (C2)[2] | — | — | — | — | — | — | 6.5 | — | — | — | — |
| D  2,4,6-trimethyl benzoyldiphenyl phosphine oxide (D1) | 15 | — | 15 | 15 | 15 | 15 | 15 | 15 | 15 | 15 | 15 |
| 1-hydroxycyclohexyl phenyl Ketone (D2) | — | 15 | — | — | — | — | — | — | — | — | — |
| E  Vinyl Silane Coupling Agent (E1) | 0.01 | 0.015 | 0.035 | 0.04 | 0.05 | 0.05 | 0.05 | — | — | 0.20 | — |
| Aminosilane Coupling Agent (E2) | — | — | — | — | — | — | — | 0.015 | — | — | — |
| Viscosity (mPa·s) (before cured) | 2100 | 2000 | 2000 | 1800 | 600 | 1200 | 1400 | 2200 | 650 | 5000 | 4500 |
| Refractive Index (after cured) | 1.49 | 1.49 | 1.56 | 1.56 | 1.52 | 1.52 | 1.53 | 1.47 | 1.47 | 1.49 | 1.49 |
| Adhesion to Glass (N/25 mm) | 38 | 38 | 38 | 39 | 37 | 36 | 37 | 25 | 12 | 30 | 29 |
| Visible Light Transmission, VLT (%) | 93 | 98 | 99 | 99 | 93 | 93 | 93 | 85 | 80 | 90 | 90 |
| Long-Term Visible Light Transmission, VLT (%)[3] | 90 | 95 | 96 | 96 | 90 | 90 | 90 | 80 | 74 | 86 | 86 |
| Thermal Stability & Durability[4] | Good | Good | Very Good | Very Good | Very Good | Very Good | Very Good | Very Poor | Very Poor | Poor | Very Poor |
| Adhesive Flexibility | Fair | Fair | Good | Good | Good | Good | Good | Fair | Poor | Fair | Fair |

Note:
[1]SMS-F9PGA, i.e., 9,9-bis[4-(3-acryloxy-2-hydroxypropyloxy) phenyl]fluorine, is commercially available from S.M.S. Technology Co., Ltd., Taiwan;
[2]SMS-F9PEOA, i.e., 9,9-bis[4-(2-acryloxyethoxy)phenyl]fluorine, is commercially available from S.M.S. Technology Co., Ltd., Taiwan;
[3]The test specimens were measured after left in 60° C. for six months.
[4]The test specimens were measured after left in 85° C. for 500 hours.

Results:

1. According to the results in Table 2, the transparent UV-curable adhesive of from Example 3 to Example 7, showed better visible light transmission (or higher refractive indexes). This proves that the transparent UV-curable adhesive of the present invention containing the acrylate group-containing bisphenol fluorene derivative ensures the desired refractive index of the cured adhesive layer.

4. By comparing all of the Examples 1-7, it is found that the disclosed transparent UV-curable adhesive of the present invention had its visible light transmission (or a higher refractive index) increased with the weight of the acrylate group-containing bisphenol fluorene derivative added. However, it is also found from Example 4 that when the usage amount of the acrylate group-containing bisphenol fluorene derivative reached 2.5 wt % or above, the adhesion of the resulting adhesive layer reduced.

5. As to thermal stability and durability, it is found that the transparent UV-curable adhesive compositions of Examples 1-7 containing the silane coupling agent showed better thermal stability and durability as compared to the UV-curable adhesive compositions of Comparative Examples 1 and 2 without the silane coupling agent.

6. According to a comprehensive comparison about the refractive index, adhesion, visible light transmission, thermal stability and durability, the UV-curable adhesive composition of Comparative Example 4 containing the bisphenol fluorene derivative but not having the silane coupling agent had its many physical properties close to those of the transparent UV-curable adhesive compositions of Examples 1-7, but was significantly inferior in terms of thermal stability and durability. As demonstrated by the results of Comparative Example 3, when the amount of the silane coupling agent increases, the adhesion of the resulting UV-curable adhesive decreases, which is obviously adverse to the adhesive layer's adhesion.

What is claimed is:

1. A transparent ultraviolet curable adhesive for use in adhering to an indium tin oxide (ITO) material in a touch panel, being a solventless composition, when cured having a refractive index of 1.49-1.56 as well as having a visible light transmittance of 93-99 VLT (%), and being composed of the following components of (A)-(E), based on a total weight of the composition:
   (A) 35-65 wt % of a polyurethane (meth)acrylate resin having a weight-average molecular weight (Mw) of 10,000-50,000;
   (B) 30-60 wt % of a (meth)acrylate monomer;
   (C) 0.1-5 wt % of an acrylate group-containing bisphenol fluorene derivative which is one or more selected from the group consisting of 9,9-bis[4-(3-acryloxy-2-hydroxypropyloxy)phenyl]fluorene, 9,9-bis[4-(2-acryloxyethoxy)phenyl]fluorine and 9,9-bis[4-(allyloxy)-3-methylphenyl];
   (D) 0.3-8 wt % of a photopolymerization initiator; and
   (E) 0.002-0.01 wt % of a vinyl silane coupling agent selected from vinyl trimethoxy silane or/and vinyl triethoxy silane;
wherein the (meth)acrylate monomer is one or more selected from the group consisting of methyl (meth)acrylate, ethyl (meth)acrylate, propyl (meth)acrylate, isopropyl (meth)acrylate, butyl (meth)acrylate, isobutyl (meth)acrylate, cyclohexyl (meth)acrylate, octyl (meth)acrylate, isooctyl (meth)acrylate, 2-ethylhexyl (meth)acrylate, isodecyl (meth)acrylate, lauryl (meth)acrylate, isobornyl (meth)acrylate, (meth)acrylamide, (meth)acryloyl morpholine, dimethyl (meth)acrylamide, diethyl (meth)acrylamide and dimethylaminopropyl acrylamide.

2. The transparent ultraviolet curable adhesive of claim 1, wherein the polyurethane (meth)acrylate resin having a weight-average molecular weight (Mw) of 25,000-35,000 is obtained by reacting a polyol having more than two hydroxyl groups, a polyisocyanate having more than two isocyanate groups and a hydroxyl group-containing (meth)acrylic monomer.

3. The transparent ultraviolet curable adhesive of claim 1, wherein the (meth)acrylate monomer is composed of 2-ethylhexyl acrylate, dimethyl acrylamide, and isobornyl acrylate, and, based on a weight of the 2-ethylhexyl acrylate, is composed of 2-ethylhexyl acrylate of 100 wt %, dimethyl acrylamide of 50-80 wt % and isobornyl acrylate of 20-50 wt %.

4. The transparent ultraviolet curable adhesive of claim 2, wherein the polyurethane (meth)acrylate resin is in an amount of 40-60 wt %.

5. The transparent ultraviolet curable adhesive of claim 2, wherein the (meth)acrylate monomer is in an amount of 40-55 wt %.

6. The transparent ultraviolet curable adhesive of claim 2, wherein the photopolymerization initiator is in an amount of 1.0-5.0 wt %.

7. The transparent ultraviolet curable adhesive of claim 2, wherein the vinyl silane coupling agent is in an amount of 0.006-0.01 wt %.

8. The transparent ultraviolet curable adhesive of claim 2, wherein the vinyl silane coupling agent is in an amount of 0.0075 wt %.

9. The transparent ultraviolet curable adhesive of claim 3, wherein the dimethyl acrylamide in the (meth)acrylate monomer is no more than 30 wt %, based on the total weight of the composition.

10. The transparent ultraviolet curable adhesive of claim 3, wherein the adhesive when cured has a refractive index of 1.52-1.56.

11. The transparent ultraviolet curable adhesive of claim 1, wherein the acrylate group-containing bisphenol fluorene derivative is in an amount of 0.25-2.5 wt %.

12. The transparent ultraviolet curable adhesive of claim 1, wherein the acrylate group-containing bisphenol fluorene derivative is in an amount of 2.5 wt %.

* * * * *